(12) United States Patent
Hum et al.

US010073779B2

(10) Patent No.: US 10,073,779 B2
(45) Date of Patent: Sep. 11, 2018

(54) PROCESSORS HAVING VIRTUALLY CLUSTERED CORES AND CACHE SLICES

(71) Applicant: Intel Corporation, Santa Clara, CA (US)

(72) Inventors: Herbert H. Hum, Portland, OR (US); Brinda Ganesh, Hillsboro, OR (US); James R. Vash, Littleton, MA (US); Ganesh Kumar, Fort Collins, CO (US); Leena K. Puthiyedath, Beaverton, OR (US); Scott J. Erlanger, Brookline, MA (US); Eric J. Dehaemer, Shrewsbury, MA (US); Adrian C. Moga, Portland, OR (US); Michelle M. Sebot, Haifa (IL); Richard L. Carlson, Fort Collins, CO (US); David Bubien, Fort Collins, CO (US); Eric Delano, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 503 days.

(21) Appl. No.: 13/729,579

(22) Filed: Dec. 28, 2012

(65) Prior Publication Data

US 2014/0189239 A1    Jul. 3, 2014

(51) Int. Cl.
    *G06F 12/00*      (2006.01)
    *G06F 12/0831*    (2016.01)
    *G06F 12/0811*    (2016.01)
    *G06F 12/084*     (2016.01)

(52) U.S. Cl.
    CPC ........ *G06F 12/0831* (2013.01); *G06F 12/084* (2013.01); *G06F 12/0811* (2013.01)

(58) Field of Classification Search
    CPC .. G06F 12/084; G06F 12/023; G06F 12/0831; G06F 12/0811
    See application file for complete search history.

(56) References Cited

U.S. PATENT DOCUMENTS

| | | |
|---|---|---|
| 6,115,790 A  | 9/2000  | Schimmel |
| 6,542,966 B1 | 4/2003  | Crawford et al. |
| 7,055,007 B2 | 5/2006  | Flautner et al. |
| 8,037,476 B1 | 10/2011 | Shavit et al. |
| 8,108,610 B1 | 1/2012  | Glasco et al. |

(Continued)

OTHER PUBLICATIONS

Non-Final Office Action received for U.S. Appl. No. 13/584,656, dated Feb. 13, 2014, 17 pages.

(Continued)

*Primary Examiner* — Gurtej Bansal
(74) *Attorney, Agent, or Firm* — Nicholas De Vos Webster & Elliott LLP

(57) ABSTRACT

A processor of an aspect includes a plurality of logical processors each having one or more corresponding lower level caches. A shared higher level cache is shared by the plurality of logical processors. The shared higher level cache includes a distributed cache slice for each of the logical processors. The processor includes logic to direct an access that misses in one or more lower level caches of a corresponding logical processor to a subset of the distributed cache slices in a virtual cluster that corresponds to the logical processor. Other processors, methods, and systems are also disclosed.

21 Claims, 15 Drawing Sheets

(56) References Cited

U.S. PATENT DOCUMENTS

| | | |
|---|---|---|
| 8,219,996 B1 | 7/2012 | Morris |
| 8,261,024 B1 | 9/2012 | Shavit et al. |
| 8,429,656 B1 | 4/2013 | Duluk et al. |
| 8,862,828 B2 | 10/2014 | Saraf et al. |
| 2002/0046324 A1 | 4/2002 | Barroso et al. |
| 2002/0049859 A1* | 4/2002 | Bruckert ............ H04L 29/12009 709/246 |
| 2003/0061423 A1* | 3/2003 | Rankin et al. ................. 710/260 |
| 2004/0226026 A1 | 11/2004 | Glass et al. |
| 2006/0004796 A1 | 1/2006 | Nakamura |
| 2006/0206635 A1 | 9/2006 | Alexander et al. |
| 2007/0156964 A1 | 7/2007 | Sistla |
| 2008/0022261 A1 | 1/2008 | Gooding |
| 2008/0126750 A1 | 5/2008 | Sistla |
| 2008/0195719 A1* | 8/2008 | Wu et al. ....................... 709/213 |
| 2009/0037658 A1* | 2/2009 | Sistla ............................ 711/119 |
| 2009/0049248 A1 | 2/2009 | Clark et al. |
| 2009/0089470 A1 | 4/2009 | Ven |
| 2009/0187642 A1* | 7/2009 | McGrath ....................... 709/220 |
| 2009/0193064 A1 | 7/2009 | Chen et al. |
| 2009/0265514 A1 | 10/2009 | Biles et al. |
| 2009/0271646 A1* | 10/2009 | Talwar et al. ................. 713/322 |
| 2010/0074106 A1* | 3/2010 | Chou et al. ................... 370/229 |
| 2010/0257316 A1 | 10/2010 | Arimilli et al. |
| 2011/0035555 A1* | 2/2011 | Wang et al. ................... 711/137 |
| 2011/0055482 A1* | 3/2011 | So ........................ G06F 12/0811 711/122 |
| 2011/0087840 A1 | 4/2011 | Glasco et al. |
| 2011/0087843 A1* | 4/2011 | Zhao et al. ................... 711/129 |
| 2011/0119397 A1 | 5/2011 | Evans et al. |
| 2011/0153936 A1 | 6/2011 | Starke |
| 2011/0173394 A1 | 7/2011 | Gara et al. |
| 2011/0179199 A1 | 7/2011 | Chen et al. |
| 2011/0219208 A1 | 9/2011 | Asaad et al. |
| 2011/0252216 A1 | 10/2011 | Ylonen et al. |
| 2011/0296406 A1 | 12/2011 | Bhandari et al. |
| 2013/0073811 A1 | 3/2013 | Beckmann et al. |
| 2013/0085999 A1 | 4/2013 | Tung et al. |
| 2013/0311724 A1 | 11/2013 | Walker et al. |

OTHER PUBLICATIONS

Notice of Allowance received for U.S. Appl. No. 13/584,656, dated Jun. 9, 2014, 11 pages.

Tam, David, "Operating System Management of Shared Caches on Multicore Processors", University of Toronto, 2010, 170 Pages.

* cited by examiner

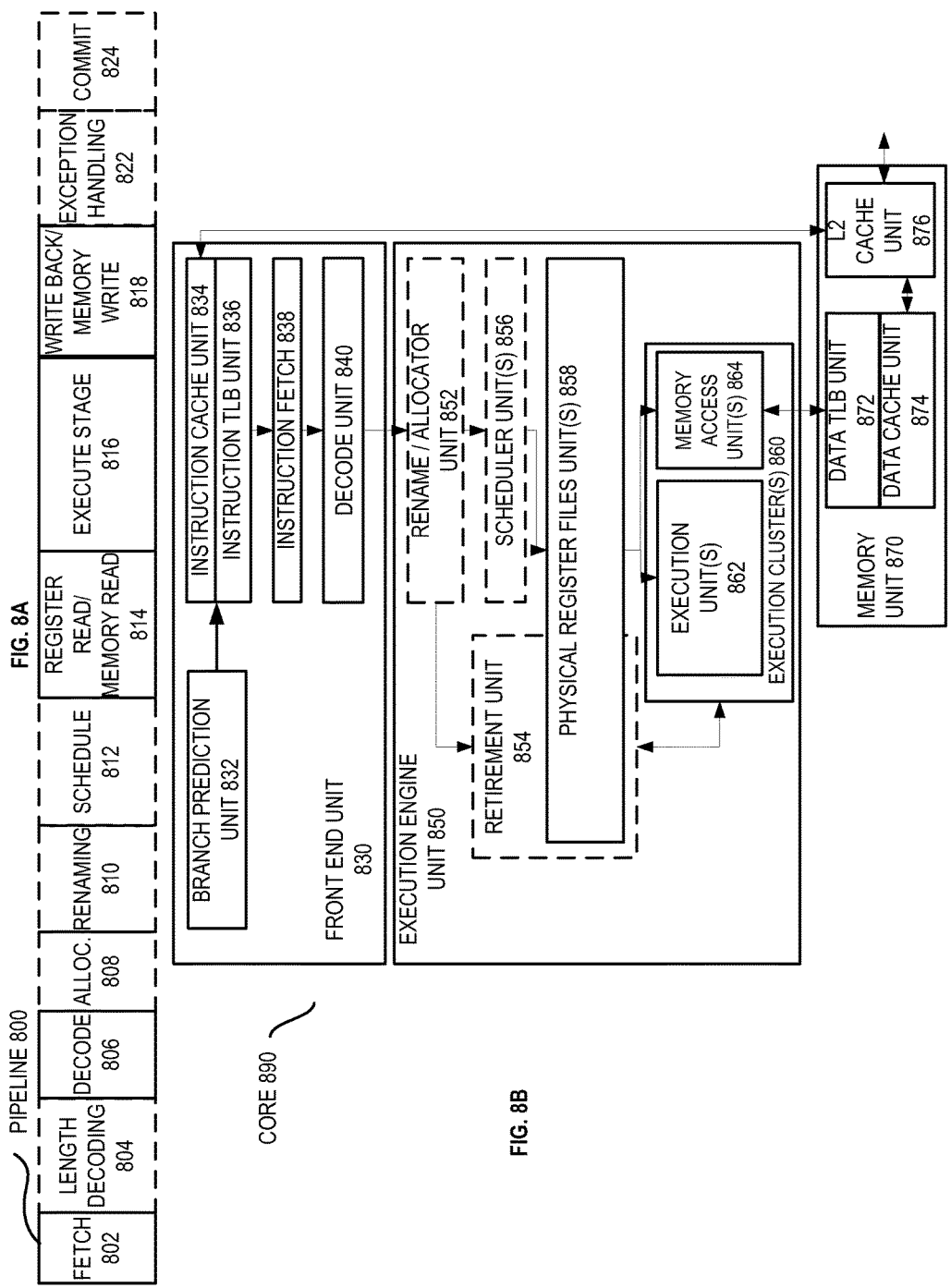

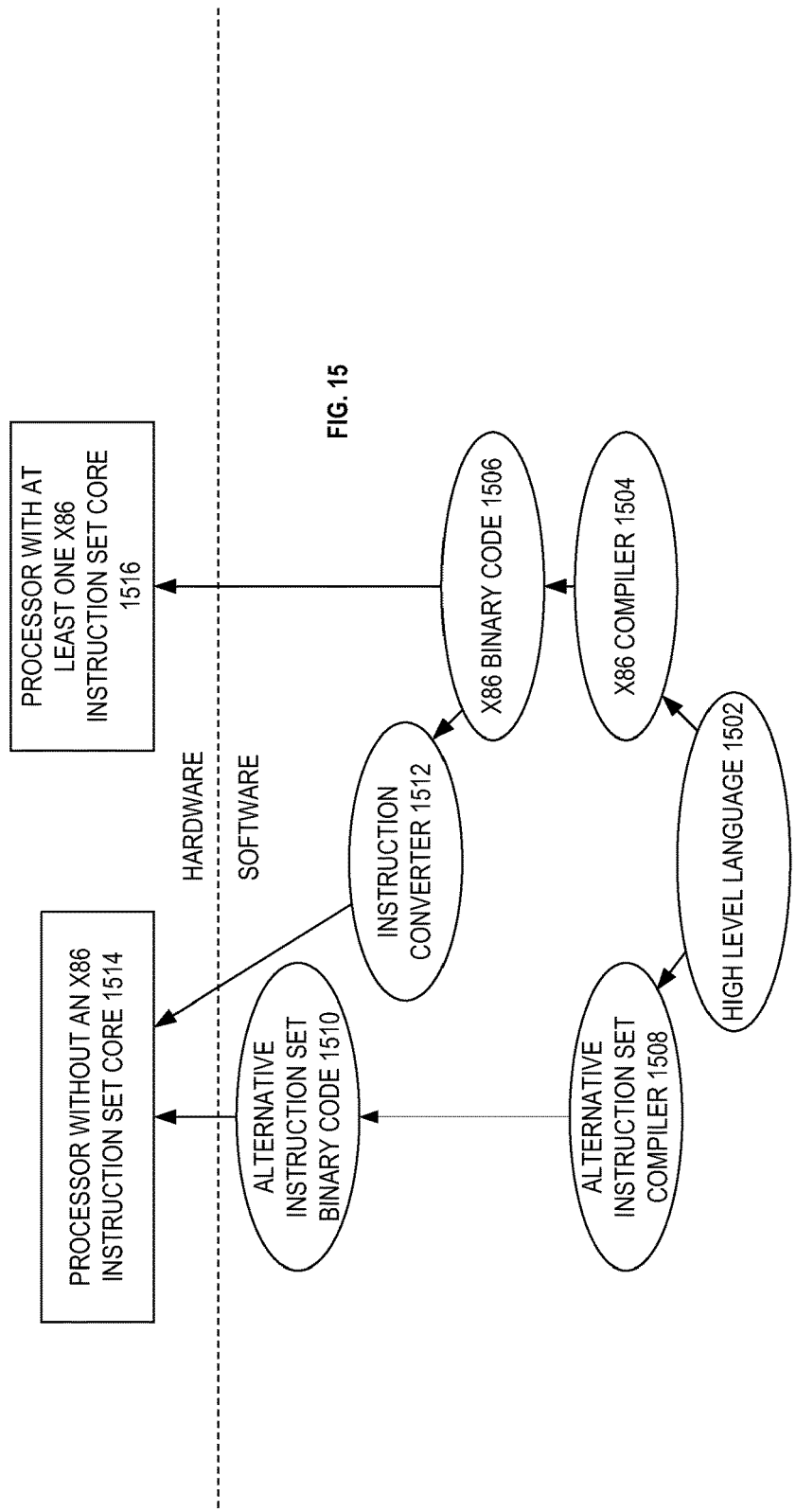

US 10,073,779 B2

PROCESSORS HAVING VIRTUALLY CLUSTERED CORES AND CACHE SLICES

BACKGROUND

Field

Embodiments relate to the field of processors. In particular, embodiments relate to the field of cache management in multi-core processors.

Background Information

Advances in semiconductor processing and logic design have permitted an increase in the amount of logic that may be included in processors and other integrated circuit devices. As a result, many processors now have multiple to many cores that are monolithically integrated on a single integrated circuit or die. The multiple cores generally help to allow multiple threads or other workloads to be performed concurrently, which generally helps to increase execution throughput.

However, the multiple cores may have a downside in terms of longer hit and/or miss latencies to a shared cache. Often, the processors have a shared cache that is physically distributed across the integrated circuit or die. For example, cache slices of the distributed cache may be co-located with corresponding cores. Commonly, all of the cores are able to access all of the cache slices. The time for a core to access data from a given cache slice generally depends on the distance between the core and the given cache slice. As a result, as the number of cores on the processor increases, the average distance between cores and cache slices, as well as the average access hit and/or miss latencies, also generally increases. In addition, the multiple or many cores also tend to increase the memory address entropy at memory controllers, which may tend to result in lower effective memory bandwidth.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 8A is a block diagram illustrating both an exemplary in-order pipeline and an exemplary register renaming, out-of-order issue/execution pipeline according to embodiments of the invention.

FIG. 8B is a block diagram illustrating both an exemplary embodiment of an in-order architecture core and an exemplary register renaming, out-of-order issue/execution architecture core to be included in a processor according to embodiments of the invention.

FIG. 15 is a block diagram contrasting the use of a software instruction converter to convert binary instructions in a source instruction set to binary instructions in a target instruction set according to embodiments of the invention.

DETAILED DESCRIPTION

Disclosed herein are processors having virtually clustered cores and cache slices, methods performed by and/or within the processors, and systems incorporating one or more of such processors. In the following description, numerous specific details are set forth (e.g., specific numbers and arrangements of cores and cache slices, specific ways of groupings of cores and cache slices into clusters, specific interconnects, processor configurations, microarchitectural details, logic partitioning/integration details, sequences of operations, types, interrelationships of system components, and the like). However, it is understood that embodiments of the invention may be practiced without these specific details. In other instances, well-known circuits, structures and techniques have not been shown in detail in order not to obscure the understanding of this description.

Figure 1:
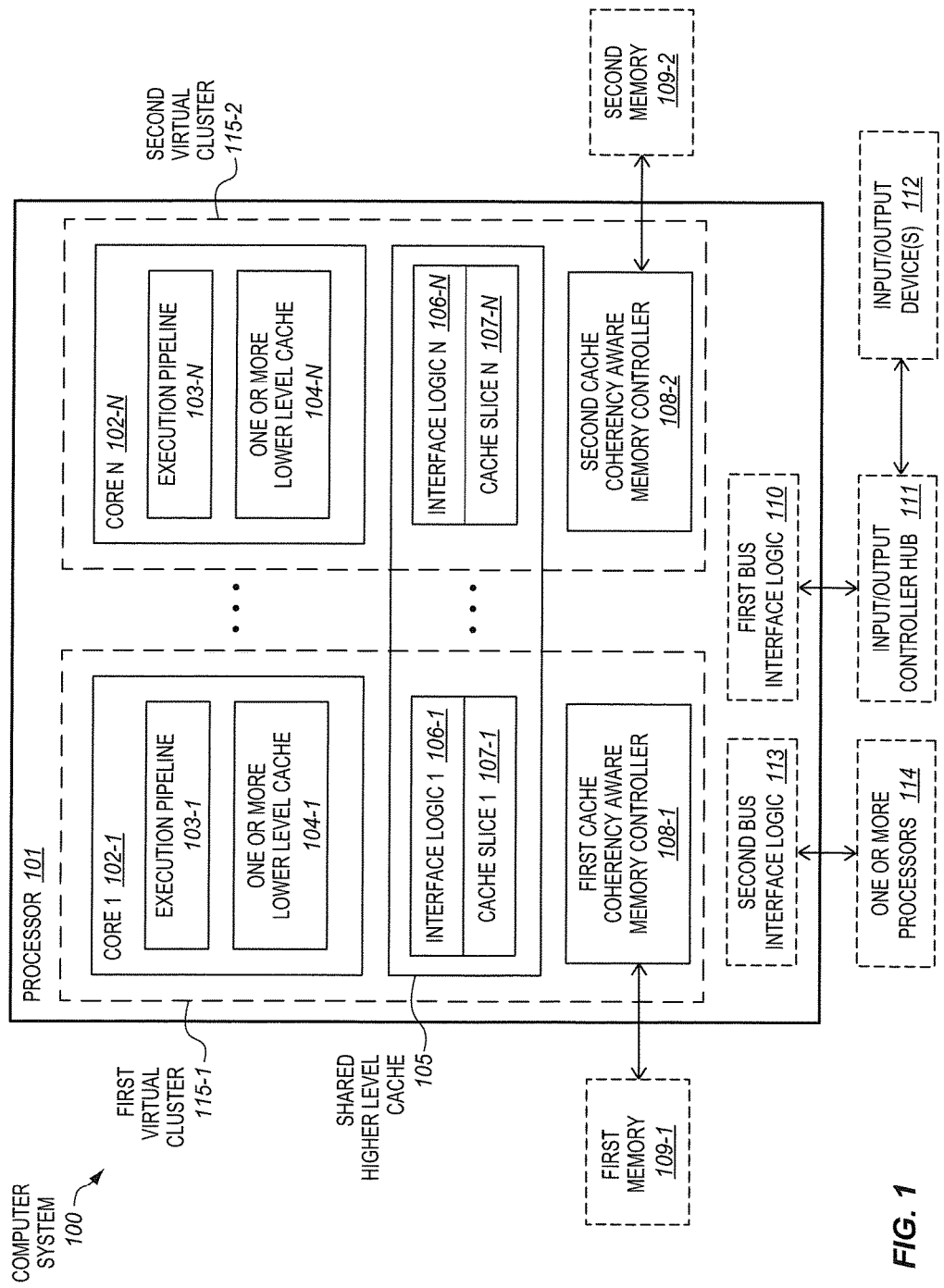
FIG. 1 is a block diagram of an example computer system including an embodiment of a processor.

FIG. 1 is a block diagram of an example computer system 100 including an embodiment of a processor 101. In some embodiments, the processor may be a general-purpose processor (e.g., of the type used in server, desktop, laptop, netbook, tablet, smartphone, cell phone, smart television, video game console, and like computer systems). Alternatively, the processor may be a special-purpose processor. Examples of suitable special-purpose processors include, but are not limited to, network processors, communications processors, cryptographic processors, graphics processors, coprocessors, embedded processors, and digital signal processors (DSPs), to name just a few examples.

The processor represents a physical processor, integrated circuit, or die. The physical processor may include any desired number of cores, other processing elements, or other logical processors. The illustrated embodiment of the physical processor is a multi-core processor including a first core 1 102-1 through an Nth core N 102-N, where N may be any appropriate number, often ranging from two to several hundred, more often on the order of tens (e.g., ten to one hundred). The cores are coupled together by one or more on-die or on-substrate interconnect structures (e.g., a ring, torus, mesh, other known interconnect structure, etc.). The core 1 includes an execution pipeline 103-1. Similarly, the core N includes an execution pipeline 103-N. Each execution pipeline may represent any known pipeline, and may include, for example, fetch logic, decode logic, allocation logic, renaming logic, scheduling logic, register access logic, execution logic, write back logic, and commit logic, or various combinations thereof. The cores may be either single threaded or multi-threaded. The cores 102 may be symmetric cores, asymmetric cores (e.g., heterogeneous cores), or some may be symmetric and others asymmetric.

The term core often refers to logic located on an integrated circuit that is capable of maintaining an independent architectural state (e.g., an execution state), in which the independently maintained architectural state is associated with dedicated execution resources. In contrast, the term hardware thread often refers to logic located on an integrated circuit that is capable of maintaining an independent architectural state, in which the independently maintained architectural state shares access to the execution resources it uses. When certain resources are shared by an architectural state, and others are dedicated to the architectural state, the line between a core and a hardware thread is less distinct. Nevertheless, the core and the hardware thread are often viewed by an operating system as individual processing elements or logical processors. The operating system is generally able to individually schedule operations on each of the cores, hardware threads, or other logical processors or processing elements. In other words, a processing element or logical processor, in one embodiment, may represent any on-die processor logic capable of being independently associated with code, such as a software thread, operating system, application, or other code. While many of the embodiments herein show cores as examples of the logical processors or processing elements, in other embodiments these cores may be replaced by other logical processors or processing elements. Examples of such other logical processors or processing elements include, but are not limited to, hardware threads, thread units, thread slots, process units, contexts, and/or any other logic that is capable of holding state and being independently associated with code.

Referring again to FIG. 1, the core 1 includes one or more lower level caches 104-1. Similarly, the core N includes one or more lower level caches 104-N. In some embodiments, each core may have a single level of lower level cache. In other embodiments, each core may have two or more levels of lower level cache (e.g., a lowest level of cache closest to the core and a mid-level cache farther from the core). Each of the one or more lower level caches may cache recently obtained data and/or instructions. The pipelines within each core may attempt to access data and/or instructions within the one or more lower level cache(s) of the corresponding core.

The core 1 102-1 through the core N 102-N also share a higher level cache 105. The one or more lower level caches 104 are referred to as lower level because they are closer physically and/or logically to their corresponding cores (e.g., the execution logic within the cores) than the shared higher level cache. In some embodiments, the cores may check the one or more lower level caches for data and/or instructions first. Then, if the sought data is not found in the one or more lower levels of cache, the cores may proceed to check the shared higher level cache. In some embodiments, the higher level shared cache may represent a last level data and/or instruction cache (LLC). The LLC may represent the last cache in the memory hierarchy on the processor (e.g., on die).

The processor also includes a first cache coherency aware memory controller 108-1 to couple the processor with a first memory 109-1, and a second cache coherency aware memory controller 108-2 to couple the processor with a second memory 109-2. In some embodiments, each cache coherency aware memory controller may include home agent logic that is operable to perform cache coherency and second memory controller logic that is operable to interact with the memory. For simplicity, in the present description, such a home agent and memory controller functionalities will be referred to as a cache coherency aware memory controller. Other embodiments may include fewer or more cache coherency aware memory controllers. Moreover, while in the illustrated embodiment, the cache coherency aware memory controllers are on-die or on-processor, in other embodiments they may instead be off-die or off-processor (e.g., as one or more chipset components).

Conventionally, the cores would generally access the first and second memories through the first and second cache coherency aware memory controllers, as well as through any intervening cores that are coupled between the accessing cores and the cache coherency aware memory controllers. Accesses through multiple or potentially many intervening cores generally tends to take more time, resulting in greater memory access latencies, than accesses through less or no intervening cores. This generally translates to reduced performance in a conventional system, as well as possibly extra power consumption and heat generation (e.g., due to extra electrical signals, to wake intervening sleeping cores, etc.).

The processor also includes first optional bus interface logic 110 to couple the processor with an input/output (I/O) controller hub 111 and one or more I/O devices 112. In other embodiments, the I/O controller hub may be replaced by another type of chipset component, or the I/O controller hub may be integrated on-die. The processor also includes second optional bus interface logic 113 to couple the processor with one or more other processors 114 (e.g., in the case of a server or other multi-socket system). In the illustration, the first and second memories 109, the I/O controller hub 111, the I/O device(s) 112, and the one or more processors 114, are shown in dashed lines to indicate that, in some embodiments, they are system-level components of a system in which the processor is deployed, and are not necessarily components of the processor.

The shared higher level cache 105 is commonly implemented as a distributed cache including multiple physically distributed cache slices 107. For example, a first cache slice 1 107-1 may correspond to, and often be closely physically located on die with (e.g., co-located with), the first core 1 102-1. Similarly, an Nth cache slice N 107-N may correspond to, and often be closely physically located on die relative to (e.g., co-located with), the Nth core N 102-N. The cache slices are often in the uncore portion of the processor.

A first core-cache slice interface logic 1 106-1 may interface the cores to the first cache slice 1 107-1. Similarly, an Nth core-cache slice interface logic N 106-N may interface the cores to the Nth cache slice N 107-N. In some embodiments, each core-cache slice interface logic may include a first core interface logic (e.g., a corebo) and a second cache slice interface logic (e.g., a cachebo) that work together to provide a core-cache slice interface, although this is not required. The set of all cache slice interface logic may also be referred to herein as a caching agent. The collective set of cache slice interface logic (e.g., the set of all cachebo) may also be referred to as a caching agent of the processor or physical socket.

As discussed above in the background section, the distributed shared cache may have a downside of longer shared cache hit and/or miss latencies especially when there are many cores. Conventionally, all of the cores of the processor usually have access to all of the cache slices on the die. The time for a core to access data from a given cache slice generally depends on the distance between the core and the given cache slice. For example, it will generally take longer for a core to access data from a remote cache slice than from a nearby cache slice. As a result, as the number of cores on the processor increases, the average distance between cores and cache slices, as well as the average access hit and/or miss latencies, also generally increases. In addition, the multiple or many cores generally tend to increase the address entropy at cache coherency aware memory controllers (e.g., different cores may be processing different workloads and accessing different pages and/or data structures in memory) which may tend to result in lower effective memory bandwidth.

In some embodiments, the cores 102 and distributed portions of the shared higher level cache 105 of the same monolithic integrated circuit, die, or semiconductor substrate may be logically or virtually partitioned, clustered, or otherwise grouped into two or more partitions, clusters, or other groups. For example, as shown in the illustrated embodiment, the first core 1 102-1, the first cache slice 1 107-1, the first interface logic 1 106-1, and the first cache coherency aware memory controller 108-1 may be logically or virtually clustered or grouped into a first virtual cluster 115-1. Similarly, the Nth core N 102-N, the Nth cache slice N 107-1, the Nth interface logic N 106-N, and the second cache coherency aware memory controller 108-1 may be logically or virtually clustered or grouped into a second virtual cluster 115-2. Other analogous components (e.g., other cores, other cache slices, etc.) may also be included in each virtual cluster. In other embodiments, instead of the cores, other logical processors and/or processing elements and their corresponding shared higher level cache slices may be similarly logically or virtually clustered. In other embodiments, instead of just two virtual clusters there may be three or more virtual clusters each having a set of one or more cores and cache slices.

In some embodiments, when an access (e.g., a memory request) misses in the one or more lower level caches 104 of a core 102, the access may be directed initially to only the cache slices 107 of the shared higher level cache 105 that are in the corresponding virtual cluster 115. In some embodiments, the logical or virtual partitioning, clustering, or grouping may be done to reduce average access hit and/or miss latencies. For example, in some embodiments, the grouping may be done based on physical proximity. For example, neighboring or physically proximate cores and/or their corresponding cache slices may be preferentially or predominantly clustered or grouped together. In some embodiments, the average distance between cores and/or cache slices within a virtual cluster (e.g., the intra-virtual cluster distance) may be less than the average distance between all cores and/or cache slices between virtual clusters and/or within a socket (e.g., the inter-virtual cluster distance). As another example, in some embodiments, the grouping may be done based on the coupling of the cores to interconnect structures. For example, the grouping may be done to predominantly virtually group cores on a common ring interconnect or other interconnect structure together.

Advantageously, this may help to improve performance by reducing hit and/or miss latencies for accesses to the shared higher level cache 105. For example, when neighboring or proximate cores and their corresponding cache slices are grouped, the accesses may be directed initially to only the neighboring or proximate cache slices of the shared higher level cache in the corresponding virtual cluster. Instead of having to check all of the cache slices, only those cache slices in the virtual cluster may need to be checked initially. Moreover, this may tend to increase the likelihood that the accesses are serviced by nearby/proximate cache slices instead of the accesses needing to travel all the way to the farthest or most remote cache slices on the die. This may tend to reduce the average distance the accesses need to travel in order to be serviced, which in turn may tend to reduce access hit and/or miss latencies. Moreover, when cores and/or cache slices on the same ring interconnect or other interconnect structure are grouped together, shorter ring stop hops, or other shorter interconnect accesses on average may be achieved as compared to if they were not on the same interconnect structures. This also may tend to reduce access hit and/or miss latencies.

In some embodiments, if the access also misses in the cache slices 107 in the corresponding virtual cluster 115, then the access may initially be directed only to a cache coherency aware memory controller 108 in the same corresponding virtual cluster 115. In some embodiments, the cache coherency aware memory controller may be the one closest to the cores and/or cache slices of that virtual cluster (e.g., closest on average, closest to the majority, or the like.). The cache coherency aware memory controller may be operable to snoop or otherwise communicate with other cache coherency aware memory controllers in order to attempt to service the request (e.g., determine where the memory address is homed).

Advantageously, this may also help to improve performance by decreasing the address entropy experienced by the cache coherency aware memory controllers. Rather than receiving addresses from all of the cores (e.g., all the different threads or other processes executing thereon), each cache coherency aware memory controllers may only receive addresses from a subset of the cores in that memory controllers virtual cluster (e.g., in some cases about half or less of the cores). As a result, each cache coherency aware memory controller may tend to see less address entropy from fewer cores serviced over a given period of time. Often, different threads or software processes tend to use different data structures in memory so reducing the number of different threads or software processes handled by a memory controller generally tends to reduce the randomness or entropy of the memory addresses it receives. This may help to improve the overall efficiency of the adaptive page open policy implemented by the cache coherency aware memory controller (e.g., resulting in improved page hit ratios). This in turn may tend to increase the effective memory bandwidth and/or memory throughput.

In some embodiments, the cache coherency aware memory controller may include logic that is operable to snoop one or more caching agents of one or more other virtual clusters of the processor (i.e., on the same die and/or within the same physical socket). In some embodiments, the cache coherency aware memory controller may include logic that is operable to indicate a particular virtual cluster and/or a particular virtual socket (e.g., by targeting a particular QPI port) when snooping a remote caching agent of a different processor (i.e., on a different die and/or in a different physical socket). Advantageously, this may help to utilize bus bandwidth efficiently (e.g., utilize QPI bandwidth in a balanced fashion). In some embodiments, the cache coherency aware memory controller may include logic that is operable to filter snoops to remote and/or local caching agents of virtual clusters/sockets using a snoop filter. In some embodiments, the cache coherency aware memory controller may include logic that is operable to reduce bus traffic (e.g., QPI bandwidth) and/or the associated power consumption by utilizing fanout snoops when snooping remote caching agents for virtual clusters of a different processor, as opposed to directed snoops that may result in multiple snoop messages to the same socket. In some embodiments, a single snoop fanout may arrive at a physical socket (e.g., at a QPI module) and in response to the single snoop fanout multiple directed snoops may be performed within the physical socket to multiple caching agents and/or virtual clusters within the physical socket (e.g., the QPI module may send one directed snoop to each of the caching agents in the physical socket).

In some embodiments, each virtual cluster of a processor (e.g., a physical socket or die) may have a copy of a cache line. Some other approaches only allow one copy of the cache line for the processor. Allowing each virtual cluster of the processor to have a copy of the cache line may offer an advantage if the operating system allocates memory in the adjacent cluster or the operating system migrates a process from one virtual cluster to another while the memory pages were not migrated to the cluster where the process presently resides.

In the illustrated embodiment, for simplicity, only two virtual clusters are shown. Other embodiments may include three, four, or more virtual clusters. In one aspect, there may be as many clusters as cache coherency aware memory controllers if it is desired to include a cache coherency aware memory controller within each cluster, which is often advantageous but is not required. In some embodiments, each of the virtual clusters may have the same number of cores and/or cache slices. This may offer certain advantages (e.g., in implementation efficiency). In other embodiments, each of the virtual clusters may have a different number of cores and/or cache slices.

To avoid obscuring the description, a relatively simple processor 101 has been shown and described. In other embodiments, the processor may optionally include other well-known components, such as, for example, an instruction fetch unit, an instruction scheduling unit, a branch prediction unit, instruction and data caches, instruction and data translation lookaside buffers, prefetch buffers, microinstruction queues, microinstruction sequencers, bus interface units, second or higher level caches, a retirement unit, a register renaming unit, other conventional components, and various combinations thereof. There are literally numerous different combinations and configurations of components in processors, and embodiments are not limited to any particular combination or configuration. The processor may represent an integrated circuit or set of one or more semiconductor dies or chips (e.g., a single die or chip, or a package incorporating two or more die or chips). In some embodiments, the processor may represent a system-on-chip (SoC) and/or a chip multi-processor (CMP).

Figure 2:
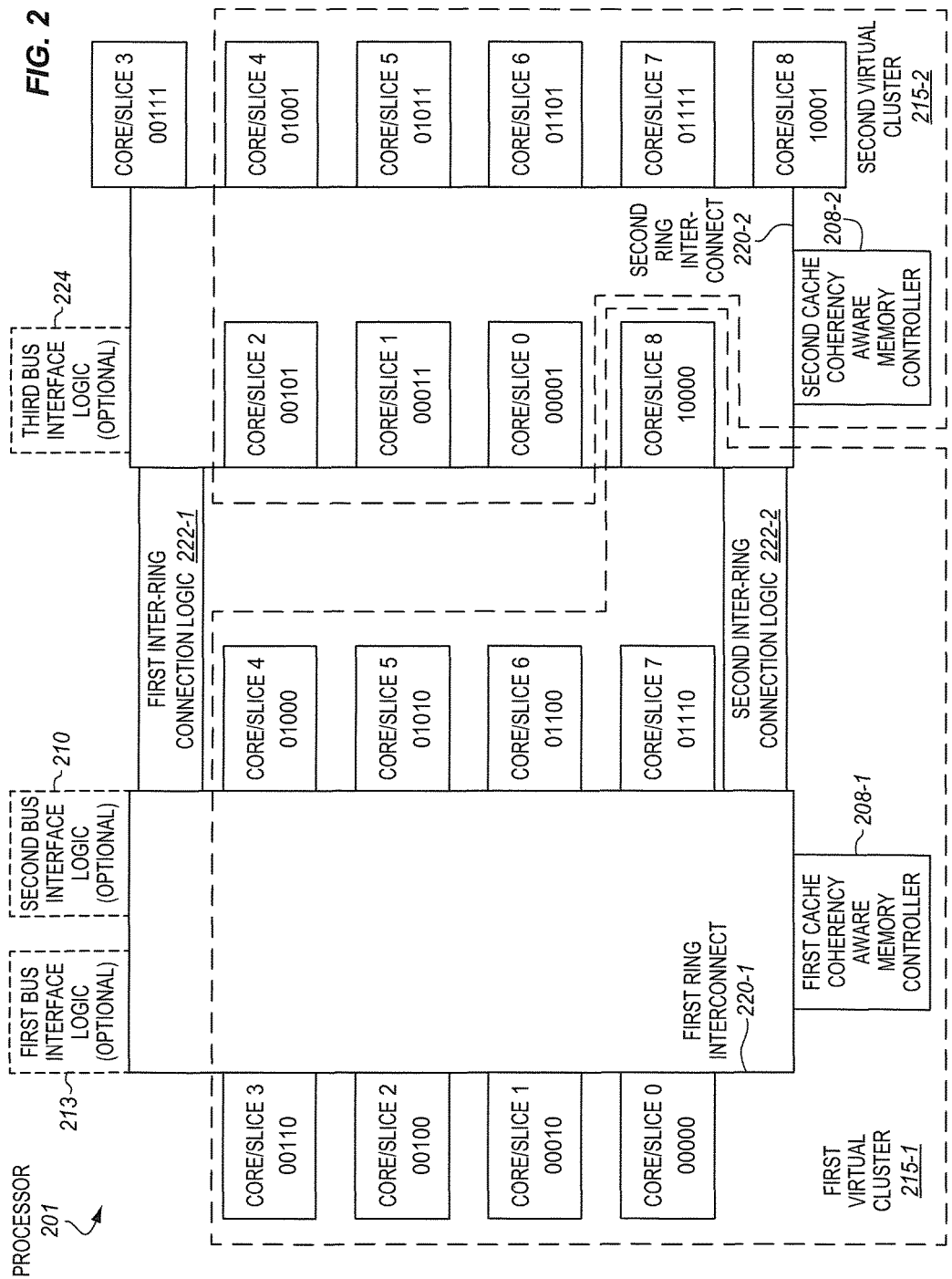
FIG. 2 is a block diagram of a first detailed example embodiment of a processor having virtual clusters.

FIG. 2 is a block diagram of a first detailed example embodiment of a processor 201 having a first virtual cluster 215-1 and a second virtual cluster 215-2. In some embodiments, the processor of FIG. 2 may be included in the system of FIG. 1. Alternatively, the processor of FIG. 2 may be included in a similar or different system. Moreover, the system of FIG. 1 may include either the same, similar, or different processor than that of FIG. 2.

The processor includes eighteen cores and eighteen corresponding (e.g., co-located) cache slices. Each of these is shown in the illustration as a core/slice. A leftmost eight of the cores/slices are coupled with a first ring interconnect 220-1. A rightmost ten of the cores/slices are coupled with a second ring interconnect 220-2. The first and second ring interconnects are coupled by a first inter-ring connection logic 222-1 and a second inter-ring connection logic 222-2. In some embodiments, each of the first and second inter-ring connection logics may be a switch box (Sbox), or other mechanism for coupling ring interconnects.

Also coupled with the first ring interconnect is an optional first bus interface logic 213 and an optional second bus interface logic 210. An optional third bus interface logic 224 is coupled with the second ring interconnect. In some embodiments, the first bus interface logic may be used to couple the processor with one or more other processors. Alternatively, in a single socket system, the first bus interface logic may be omitted. In some embodiments, the second bus interface logic may be used to couple the processor with an I/O hub (not shown). In other embodiments, an I/O controller may be integrated on processor. Examples of suitable bus interface logic include, but are not limited to, Quick Path Interconnect (QPI), other point-to-point interconnects, and other interconnects known in the arts.

A first cache coherency aware memory controller 208-1 is coupled with the first ring interconnect. A second cache coherency aware memory controller 208-2 is coupled with the second ring interconnect. The first cache coherency aware memory controller may be used to couple the processor with a first memory (not shown). The second cache coherency aware memory controller may be used to couple the processor with a second memory (not shown). In some embodiments, each of the cache coherency aware memory controllers includes a home agent including cache coherency functionality and a memory controller including memory interface functionality.

In the illustrated embodiment, the first virtual cluster includes all eight of the cores/slices (i.e., core/slice 0 through core/slice 7) coupled with the first ring interconnect as well as one core/slice (i.e., core/slice 8) coupled with the second ring interconnect. The second virtual cluster includes all remaining nine cores/slices (i.e., core/slice 0 through core/slice 8) coupled with the second ring interconnect. In other embodiments, different ways of dividing the cores/slices between the virtual clusters may be used. Notice that, in some embodiments, physically proximal cores/slices and/or cores/slices on the same interconnect structure may be preferentially or predominantly (i.e., at least a majority) included in a virtual cluster. Although this is not required, this may offer advantages of reduced hit/miss latencies, as described elsewhere herein.

Notice also that, in some embodiments, an equal number of cores/slices may be included in each of the virtual clusters. This is not required, but often offers an advantage of a simpler implementation. Commonly the memory address space of the memory may be mapped across all of the cache slices. For example, each memory address may be mapped to a cache slice through a hash function. For example, the hash of a given memory address may always provide the same value which may always map to the same cache slices. Often the hash function may attempt to approximately evenly distribute the memory addresses across the cache slices. For example, memory address A may always hash to the binary value 0111, memory address B may always hash to the binary value 0101, and so on. Since there are fewer cores/slices in a virtual cluster (e.g., half in the illustrated embodiment), a smaller hash may be used.

Referring again to FIG. 2, each of the cores/slices has a corresponding identifier as shown within the core/slice. These identifiers may be referred to as core/slice identifiers and/or ring stop identifiers. Each identifier uniquely identifies a corresponding core/slice (i.e., each core/slice has a different identifier). For example, the identifier value 00000 identifies core/slice 0 of the first virtual cluster, the identifier value 10000 identifies core/slice 8 of the first virtual cluster, the identifier value 00111 identifies core/slice 3 of the second virtual cluster, and so on. As shown, in one possible embodiment, the IDs for the cores/slices may be assigned starting from the lower left corner (as viewed) of the leftmost ring and moving around the leftmost ring counter-clockwise, and starting from the lower left corner of the rightmost ring and moving around the rightmost ring counterclockwise.

Notice that, in some embodiments, the bit-0 (i.e., the rightmost bit) of each of the identifiers is always binary zero (i.e., 0) for the first virtual cluster and is always binary one (i.e., 1) for the second virtual cluster. In some embodiments, this bit-0 having a value of binary zero (i.e., 0) may be used as an identifier of the first virtual cluster, and this bit-0 having a value of binary one (i.e., 1) may be used as an identifier of the second virtual cluster. The remaining more significant bits of the ID uniquely identify one of the cores/slices within the virtual cluster identified by bit-0. Looking at this another way, the cores/slices of one virtual cluster may be evenly numbered (e.g., 0, 2, 4, 6, etc.) and the cores/slices of the other virtual cluster may be oddly numbered (e.g., 1, 3, 5, etc.).

In some embodiments, this may allow the hash of a given memory address to always map to the same corresponding core/slice in all of the virtual clusters. For example, the hash of a given memory address with a value of 0111 may always map to core/slice 7 in the first virtual cluster as well as core/slice 7 in the second virtual cluster. In some embodiments, this may be used to efficiently implement virtual cluster-to-virtual cluster transfers of cache data. For example, if the cache data comes from core/slice 7 of the first virtual cluster and has ring stop ID 01110, then only bit-0 of the ring stop ID may be changed/flipped to obtain the ring stop ID for the corresponding core/slice 7 of the second virtual cluster (i.e., changing from 01110 to 01111). Accordingly, in some embodiments, having the same number of cores/slices in each virtual cluster may simplify determining to which core/slice to forward data to in the other virtual clusters, although this is not required.

Figure 3:
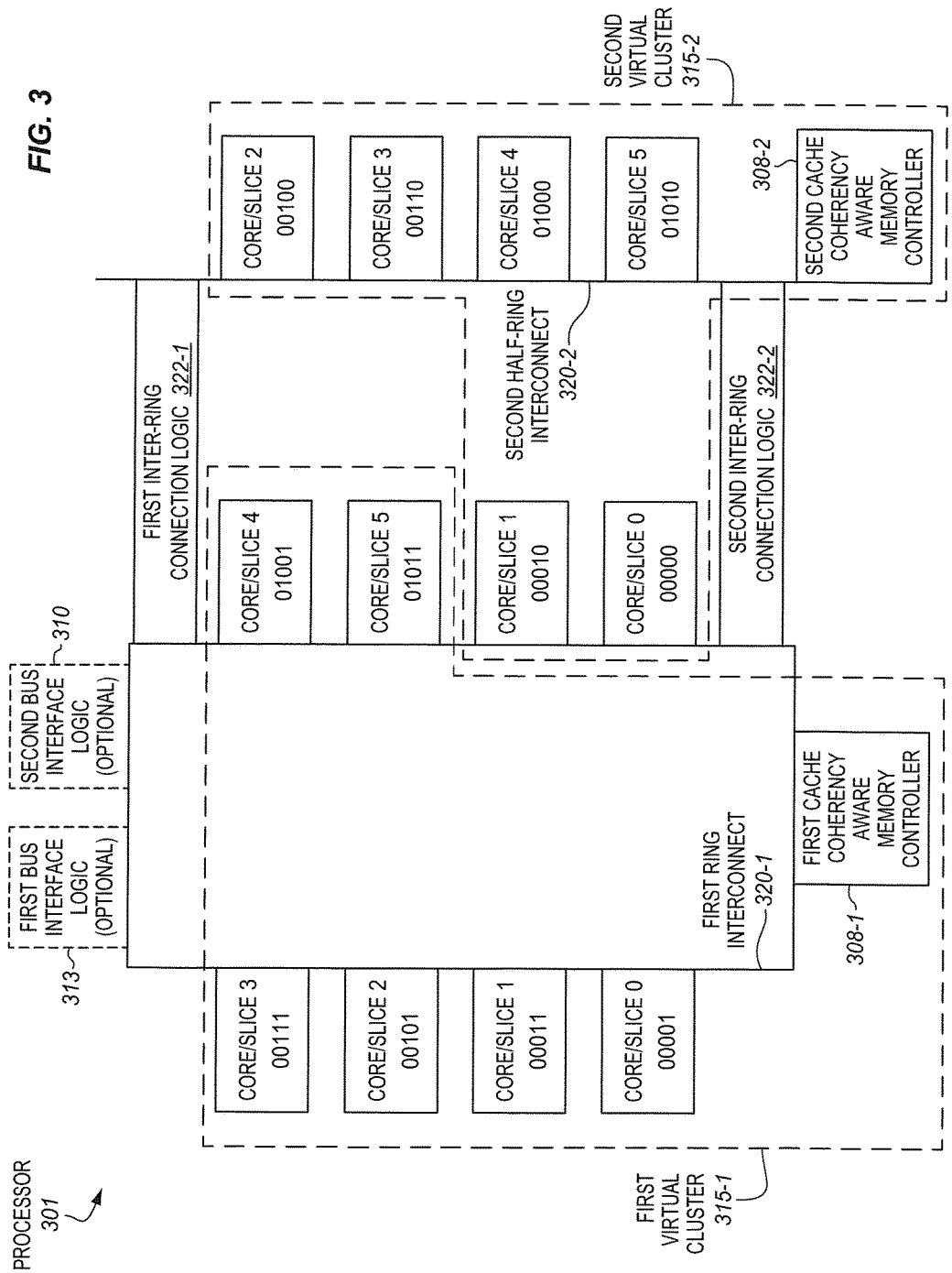
FIG. 3 is a block diagram of a second detailed example embodiment of a processor having virtual clusters.

FIG. 3 is a block diagram of a second detailed example embodiment of a processor 301 having a first virtual cluster 315-1 and a second virtual cluster 315-2. In some embodiments, the processor of FIG. 3 may be included in the system of FIG. 1. Alternatively, the processor of FIG. 3 may be included in a similar or different system. Moreover, the system of FIG. 1 may include either the same, similar, or different processor than that of FIG. 3.

The second detailed example embodiment is similar in many ways to the first detailed example embodiment previously described. Unless otherwise specified or clearly apparent the correspondingly named components may optionally have the same or similar characteristics. To avoid obscuring the description, primarily different and/or additional structures and characteristics of the second detailed example embodiment will be described, without repeating all of the similar or same features.

The processor includes twelve cores/slices. A leftmost eight of the cores/slices are coupled with a first ring interconnect 320-1. A rightmost four of the cores are coupled with a second half-ring interconnect 320-2. The first and second interconnects are coupled by a first inter-ring connection logic 322-1 and a second inter-ring connection logic 322-2.

Also coupled with the first ring interconnect is an optional first bus interface logic 313 (e.g., to couple with one or more other processors), an optional second bus interface logic 310 (e.g., to couple with an I/O hub), and a first cache coherency aware memory controller 308-1 (e.g., to couple with a memory). Examples of suitable bus interface logic include, but are not limited to, QPI. Also coupled with the second interconnect is a second cache coherency aware memory controller 308-2 (e.g., to couple with a memory). In some embodiments, each of the cache coherency aware memory controllers includes a home agent including cache coherency functionality and a memory controller including memory interface functionality.

In the illustrated embodiment, the first virtual cluster includes six (i.e., core/slice 0 through core/slice 5) of the eight cores/slices coupled with the first ring interconnect. The second virtual cluster includes the remaining two (i.e., core/slice 0 and core/slice 1) of the eight cores/slices coupled with the first ring interconnect and all four of the cores/slices coupled with the second interconnect (i.e., core/slice 2 through core/slice 5). In other embodiments, different ways of dividing the cores/slices between the virtual clusters may be used. Notice that, in some embodiments, physically proximal cores/slices and/or cores/slices on the same interconnect structure may be preferentially or predominantly included in a virtual cluster. Although this is not required, this may offer advantages of reduced hit/miss latencies, as described elsewhere herein. Notice also that, in some embodiments, an equal number of cores/slices may be included in each of the virtual clusters. This is not required, but often offers an advantage of a simpler implementation, as previously described.

Each of the cores/slices has a corresponding core/slice identifier and/or ring stop identifier as shown within the core/slice. Notice that, in some embodiments, the bit-0 (i.e., the rightmost bit) of each of the identifiers is always binary zero (i.e., 0) for the first virtual cluster and is always binary one (i.e., 1) for the second virtual cluster. In some embodiments, this bit-0 having a value of binary zero (i.e., 0) may be used as an identifier of the first virtual cluster, and this bit-0 having a value of binary one (i.e., 1) may be used as an identifier of the second virtual cluster. In other embodiments, if there are three or more virtual clusters, then two or more bits may be used to uniquely identify one of the virtual clusters. In some embodiments, this may allow the hash of a given memory address to always map to the same corresponding core/slice in all of the virtual clusters. In some embodiments, this may be used to efficiently implement virtual cluster-to-virtual cluster transfers of cache data.

FIGS. 2-3 are illustrative examples of virtual clusters, although the scope of the invention is not limited to just these examples. Other embodiments may include other numbers of cores and/or cache slices, other couplings of cores and/or cache slices, other types of interconnects, other numbers and couplings of cache coherency aware memory controllers, may omit some of the illustrated components and/or include additional components, may group cores and/or slices and/or memory controllers differently into virtual clusters, may have more than two virtual clusters, etc.

Figure 4:
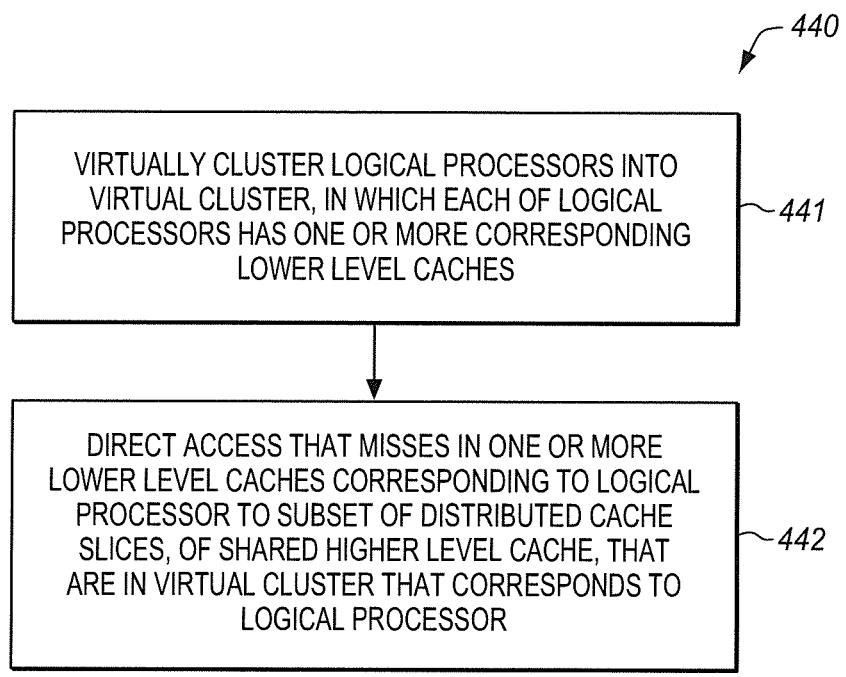
FIG. 4 is a block flow diagram of an embodiment of a method of using virtual clusters.

FIG. 4 is a block flow diagram of an embodiment of a method 440 of using virtual clusters. In some embodiments, the method may be performed by the processor of any of FIGS. 1-3. Alternatively, the method may be performed by similar or different processors. Moreover, the processors of any of FIGS. 1-3 may perform the same, similar, or different methods. The features and optional details of the processors also may apply to the method, which may be performed by and/or within the processors.

The method includes virtually clustering logical processors into a virtual cluster, at block 441. In some embodiments, each of the logical processors has one or more corresponding lower level caches. The method also includes directing an access that misses in one or more lower level caches corresponding to a logical processor to a subset of distributed cache slices, of a shared higher level cache, that are in a virtual cluster that corresponds to the logical processor, at block 442.

Figure 5:
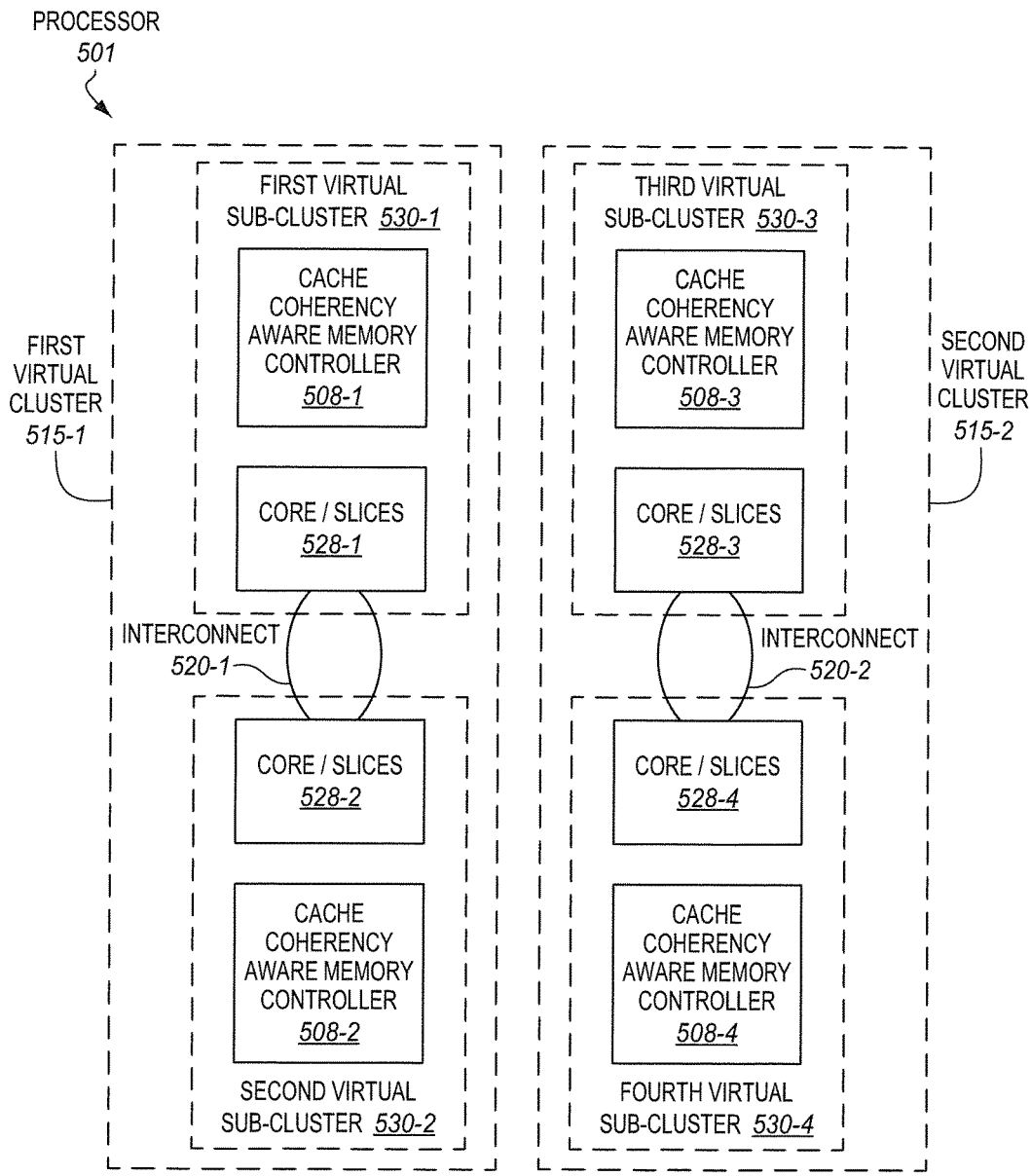
FIG. 5 is a block diagram of an embodiment of a processor having virtual clusters having virtual sub-clusters.

FIG. 5 is a block diagram of an embodiment of a processor 501 having virtual clusters 515 that have virtual sub-clusters 530. The processor includes first though fourth sets of cores/slices 528-1 through 528-4. The processor also includes first, second, third, and fourth cache coherency aware memory controllers 508-1 through 508-4. Each of the cores/slices and the cache coherency aware memory controllers may be substantially as described elsewhere herein aside from different features mentioned below.

The first and second sets of cores/slices 528-1, 528-2 and the first and second cache coherency aware memory controllers 508-1, 508-2 are included in a first virtual cluster 515-1. The third and fourth sets of cores/slices 528-3, 528-4 and the third and fourth cache coherency aware memory controllers 508-3, 508-4 are included in a second virtual cluster 515-2. In some embodiments, the first virtual cluster 515-1 is logically or virtually divided, partitioned, or clustered into a first virtual sub-cluster 530-1 including the first set of cores/slices 528-1 and the first cache coherency aware memory controller 508-1, and a second virtual sub-cluster 530-2 including the second set of cores/slices 528-2 and the second cache coherency aware memory controller 508-2. Likewise, the second virtual cluster 515-2 is logically or virtually divided, partitioned, or clustered into a third virtual sub-cluster 530-3 including the third set of cores/slices 528-3 and the third cache coherency aware memory controller 508-3, and a fourth virtual sub-cluster 530-4 including the fourth set of cores/slices 528-4 and the fourth cache coherency aware memory controller 508-4.

In some embodiments, the sub-clusters of a virtual partition are predominantly physically proximately grouped. In some embodiments, the sub-clusters of a virtual partition are part of a same interconnect ring or other interconnect structure 520-1, 520-2. In some embodiments, the cores/slices of one virtual sub-cluster of a given virtual partition are on average closer and/or on average have shorter hit/miss latencies to a memory controller of another virtual sub-cluster of the given virtual partition than virtual sub-clusters of other virtual partitions of a processor. In some embodiments, misses to a cache coherency aware memory controller of one virtual sub-cluster of a given virtual cluster may be preferentially or initially attempted to be serviced only by one or more other virtual sub-clusters of the same given virtual cluster. This may help to provide improved performance.

This is just one illustrative example of sub-clustering. Other embodiments may have other numbers of virtual clusters, other numbers of virtual sub-clusters, other numbers of memory controllers, etc.

Figure 6:
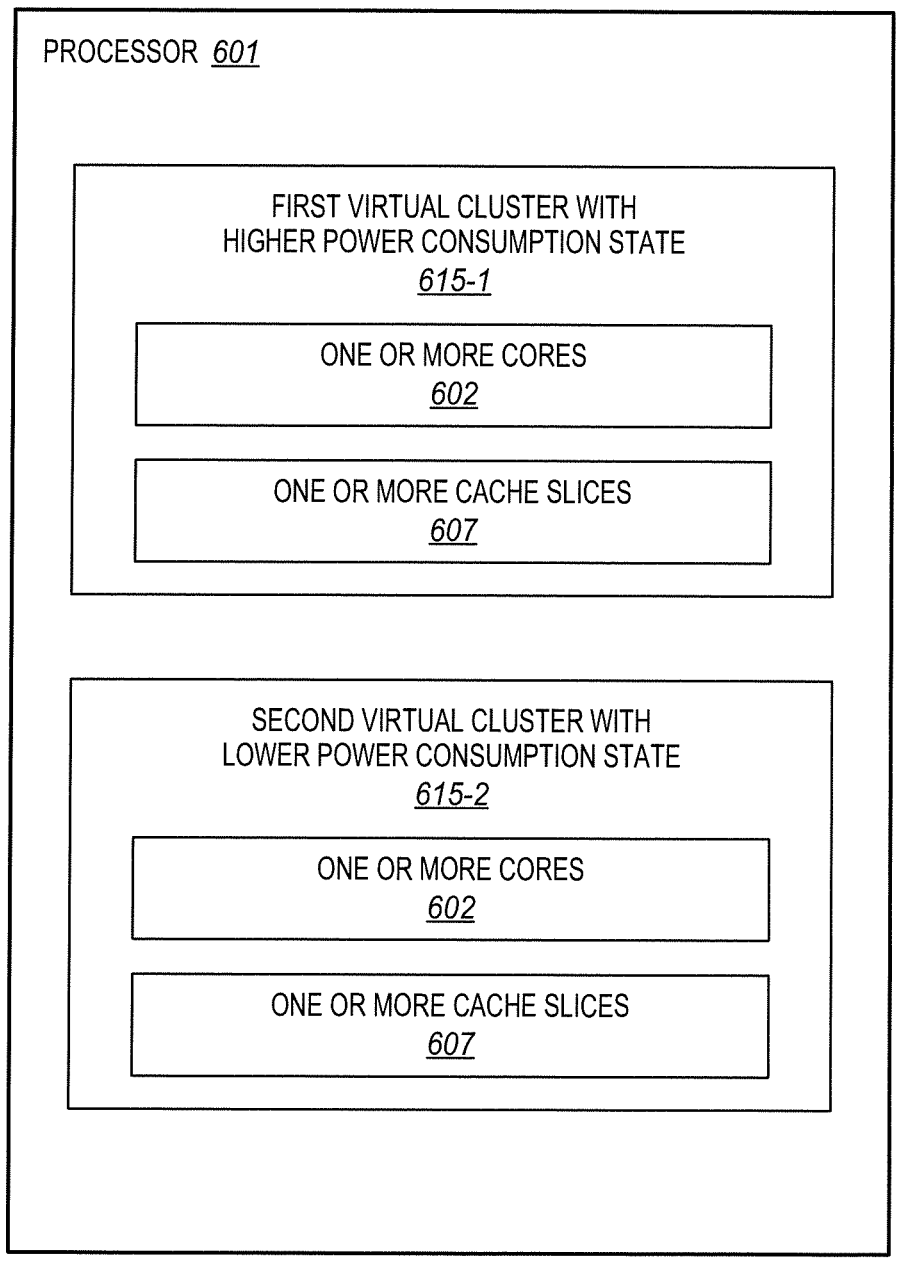
FIG. 6 is a block diagram of an embodiment of a processor having a first virtual cluster with a higher power consumption state and a second virtual cluster with a selectively reduced lower power consumption state.

FIG. 6 is a block diagram of an embodiment of a processor 601 having a first virtual cluster with a higher power consumption state 615-1 and a second virtual cluster with a selectively reduced lower power consumption state 615-2. Each of the virtual clusters includes one or more cores 602 and one or more cache slices 607. The terms lower and higher are relative terms that are relative to one another not absolute terms. Examples of suitable ways to reduce the power consumption state include, but are not limited to, reducing the frequency of the virtual cluster, reducing the voltage of the virtual cluster, gating power to the virtual cluster, and other approaches known in the arts (e.g., selectively gating power to portions of the second virtual cluster).

In some embodiments, the power consumption of the second virtual cluster may be selectively reduced based on workload (e.g., current or estimated future). For example, when the workload is not sufficient to keep both virtual clusters busy (e.g., less than a threshold amount for example 30%), an operating system, virtual machine monitor (VMM), or other software, which may be aware of the virtual clustering of the processor, may migrate or move active pages from a cache coherency aware memory controller for the second virtual cluster to that of the first virtual cluster, migrate all threads, processes, or other workloads from the second virtual cluster to the first virtual cluster, and then selectively reduce the power consumption state of the second virtual cluster. For example, the software may gate power to the one or more cores 602, the one or more cache slices 607, the cache coherency aware memory controller of the second virtual cluster, put the corresponding memory to sleep, or some combination thereof. When the workload increases, the second virtual cluster may be brought back to its previous higher power consumption state.

Figure 7:
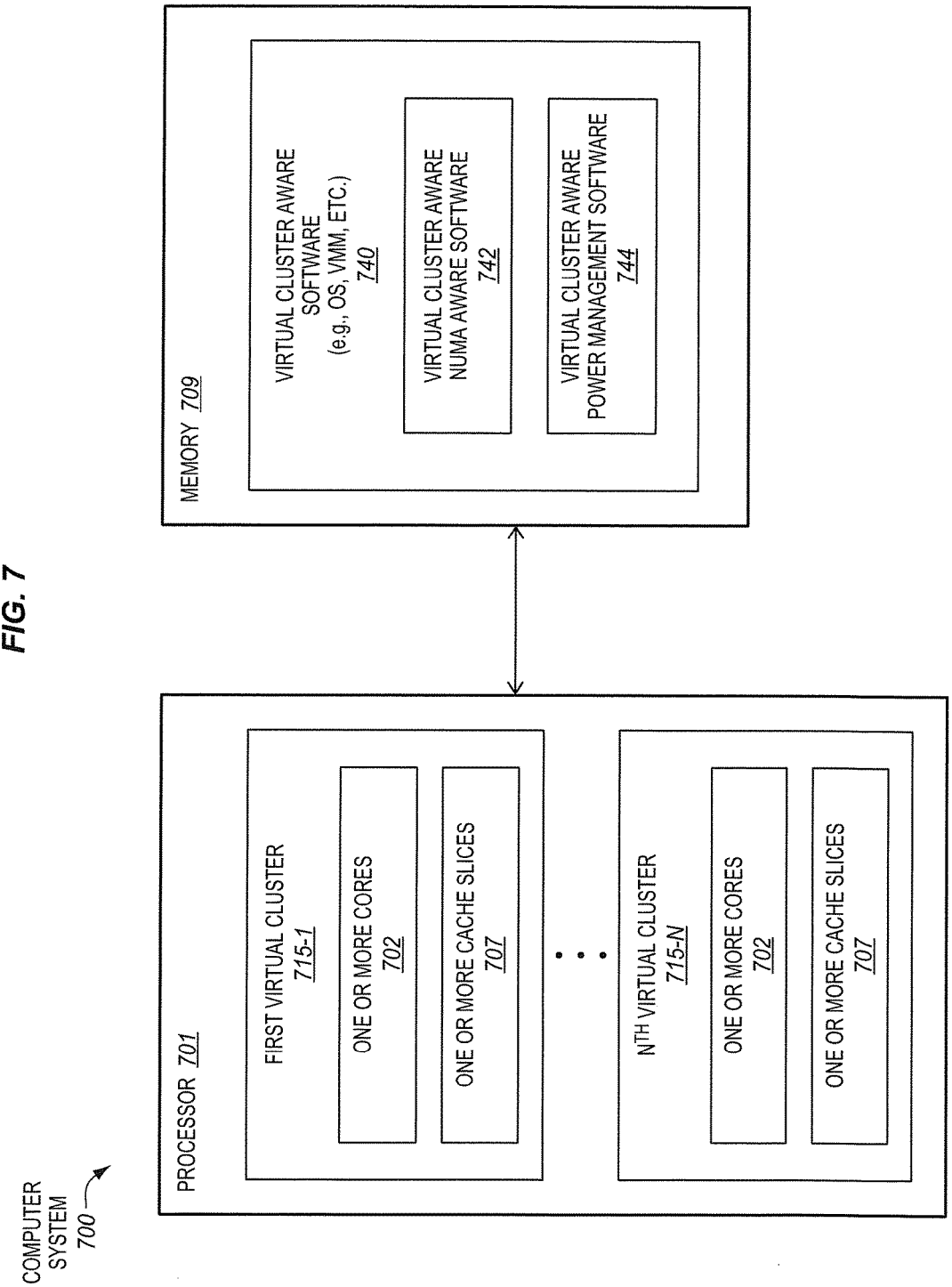
FIG. 7 is a block diagram of an embodiment of computer system including a processor having virtual clusters and a memory storing virtual cluster aware software.

FIG. 7 is a block diagram of an embodiment of computer system 700 including a processor 701 having virtual clusters 715 and a memory 709 storing virtual cluster aware software 740. The virtual clusters include a first virtual cluster 715-1 through an Nth virtual cluster 715-N, where N may be any appropriate number, often ranging from two to on the order of around ten, or so. Each virtual cluster includes one or more cores 702 and one or more cache slices 707. The virtual cluster aware software 740 is aware of the virtual clusters 715. Examples of suitable virtual cluster aware software include, but are not limited to, an operating system, a virtual machine monitor, other privileged software, user-level applications, etc.).

In some embodiments, the virtual cluster aware software may include virtual cluster aware and Non-Uniform Memory Access (NUMA) aware software 742. NUMA recognizes that memory accesses in systems may be non-uniform. For example, memory access times may depend on the location of the memory relative to a core and/or the location of the memory controller. The processor is commonly connected with a single physical socket. The physical socket may represent the physical connector on a board (e.g., a motherboard) where the processor is connected when deployed in a system. In some embodiments, logically or virtually clustering or grouping the cores and cache slices into the virtual clusters may effectively provide multiple logical or virtual sockets.

In some embodiments, the NUMA aware software may perform virtual cluster level NUMA improvements or optimizations. For example, the NUMA aware software may attempt to minimize or at least reduce cross-virtual-socket traffic and/or cross-physical socket traffic, which may help to achieve higher throughput. In some embodiments, the virtual clusters may be treated by the software as virtual sockets. In some embodiments, when a process of a given virtual cluster (e.g., running on a core of that given virtual cluster) needs more memory allocated, the NUMA aware software may allocate the additional memory from a portion of the overall memory corresponding to that given virtual cluster instead of from other memory not corresponding to that given virtual cluster. In addition, in the event of there being no available memory for the given virtual cluster, in some embodiments, the NUMA aware software may allocate the additional memory from a portion of the overall memory corresponding to another virtual cluster within the same physical socket instead of from memory corresponding to other physical sockets. Cache-to-cache transfers within a physical socket generally tend to be faster than cache-to-cache transfers between physical sockets.

Accordingly, in some embodiments, the NUMA aware software may allocate memory in a way that is based on and aware of the virtual clusters in order to help improve performance. For example, in some embodiments, the NUMA aware software may preferentially or initially allocate memory for a given virtual cluster (or given virtual socket) intra-virtual cluster (or intra-virtual socket), rather than inter-virtual cluster (or inter-virtual socket). In some embodiments, the NUMA aware software may preferentially or initially allocate memory for a given virtual cluster (or virtual socket) intra-physical socket (e.g., from virtual clusters within that physical socket) rather than inter-physical socket (e.g., from virtual clusters of different physical sockets).

In some embodiments, the virtual cluster aware software may also include virtual cluster aware power management software 744. The virtual cluster aware power management software may perform power management of a virtual cluster as previously described in conjunction with FIG. 6.

In some embodiments, the features of the processors of FIGS. 6-7 may be included in the processors of any of FIGS. 1-3. Alternatively, the features of the processors of FIGS. 6-7 may be included in similar or different processors. Moreover, the processors of any of FIG. 1-3 may have the same, similar, or different features than the processors of FIGS. 6-7.

While distributed shared caches have been disclosed herein, other embodiments may use centralized shared caches. These embodiments may still benefit from reduced address entropy at the cache coherency aware memory controllers. While embodiments have shown ring-type interconnects, other embodiments may use other interconnects, such as, for example, torus, mesh, point-to-point, multi-drop, or other known types of interconnects. Exemplary Core Architectures, Processors, and Computer Architectures Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s)

856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 9B:
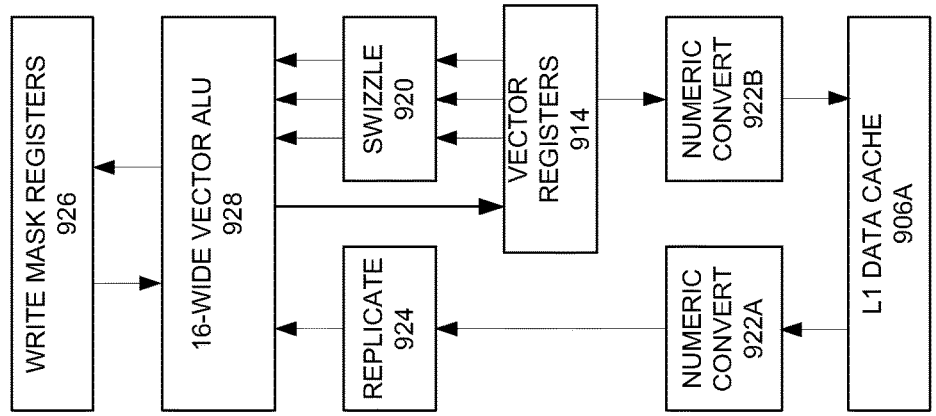
FIG. 9B is an expanded view of part of the processor core in FIG. 9A according to embodiments of the invention.
Figure 9A:
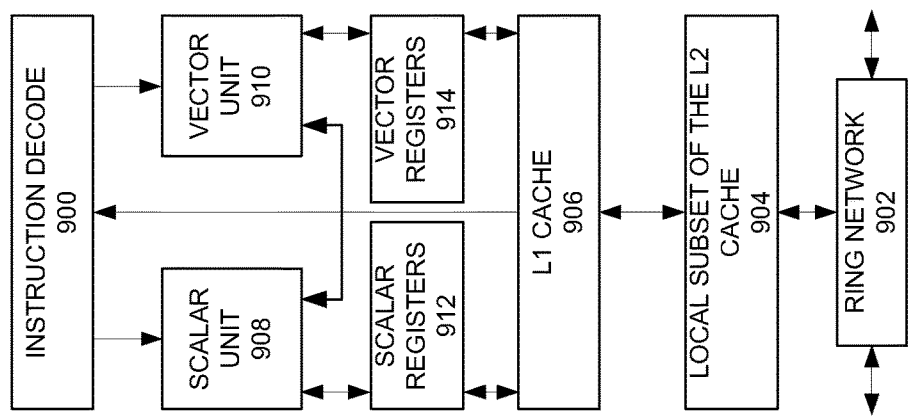
FIG. 9A is a block diagram of a single processor core, along with its connection to the on-die interconnect network and with its local subset of the Level 2 (L2) cache, according to embodiments of the invention.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bidirectional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
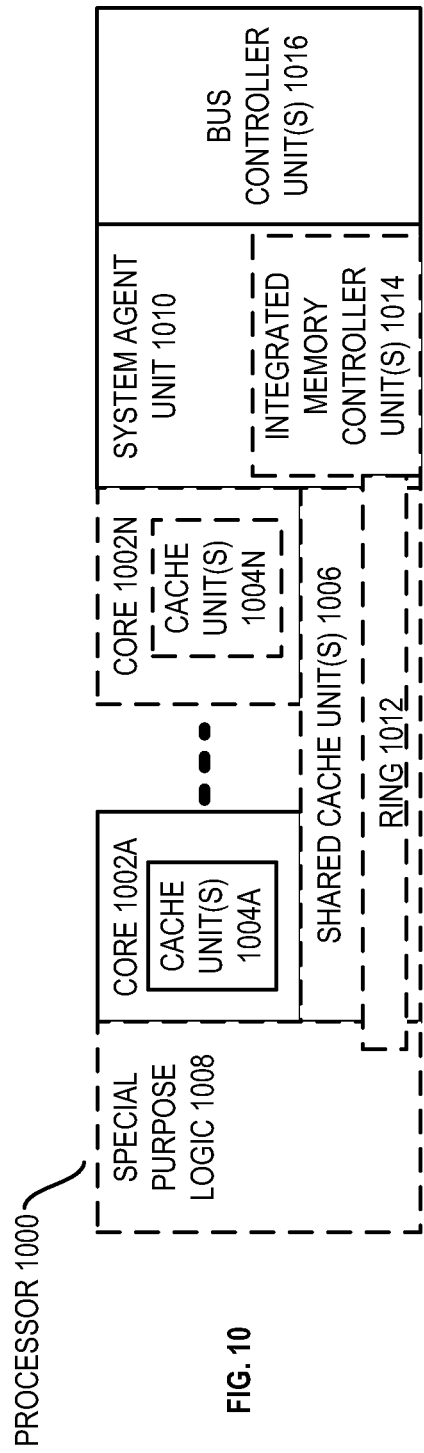
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
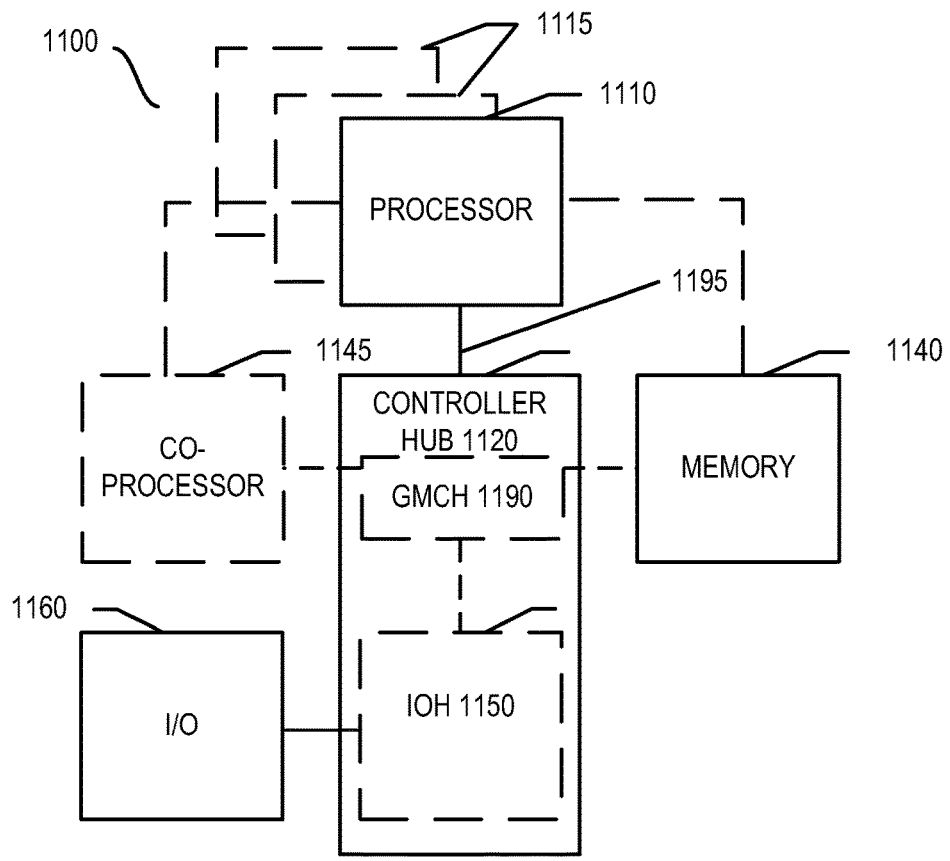
FIG. 11 shown is a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s)

1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
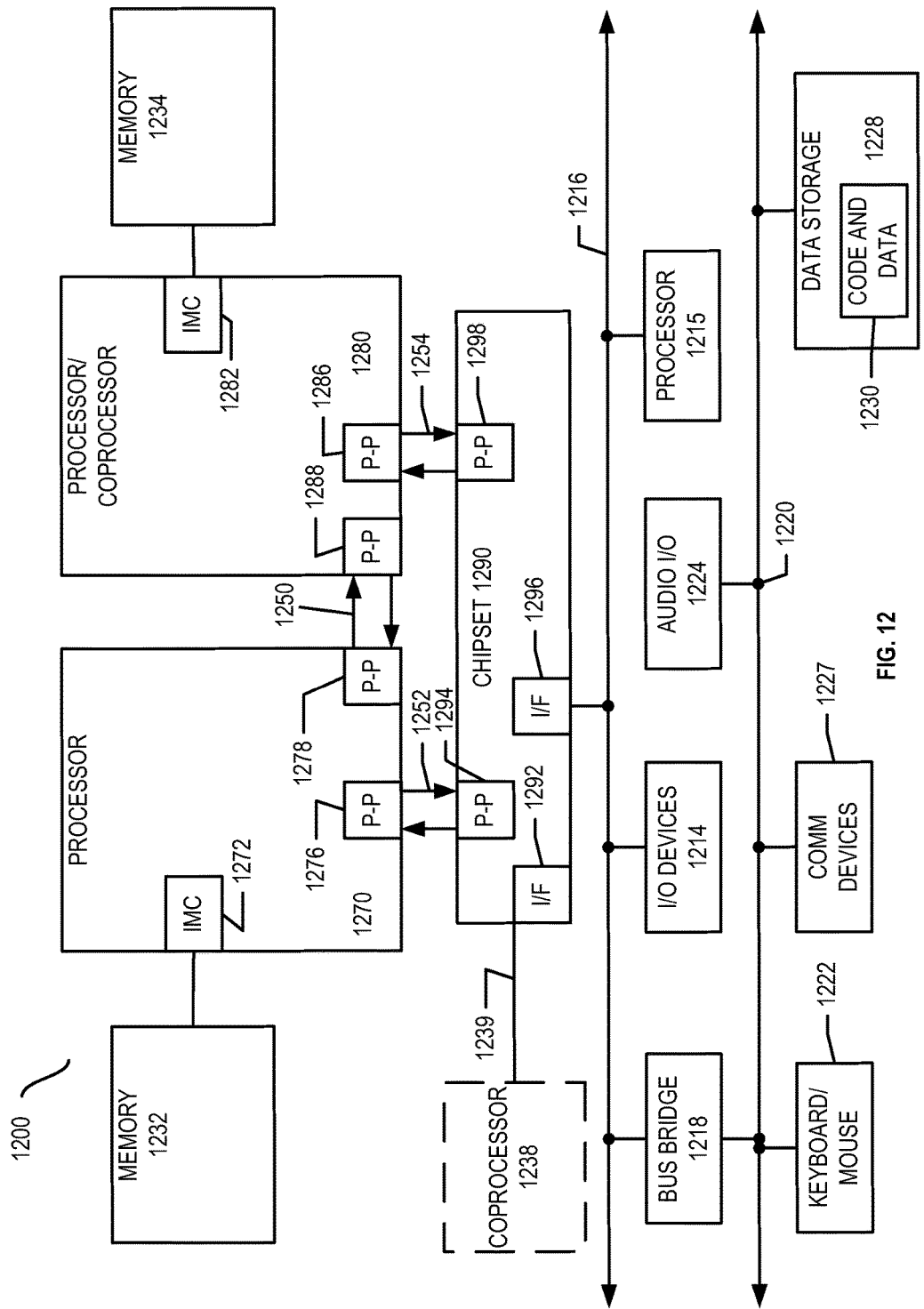
FIG. 12 shown is a block diagram of a first more specific exemplary system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
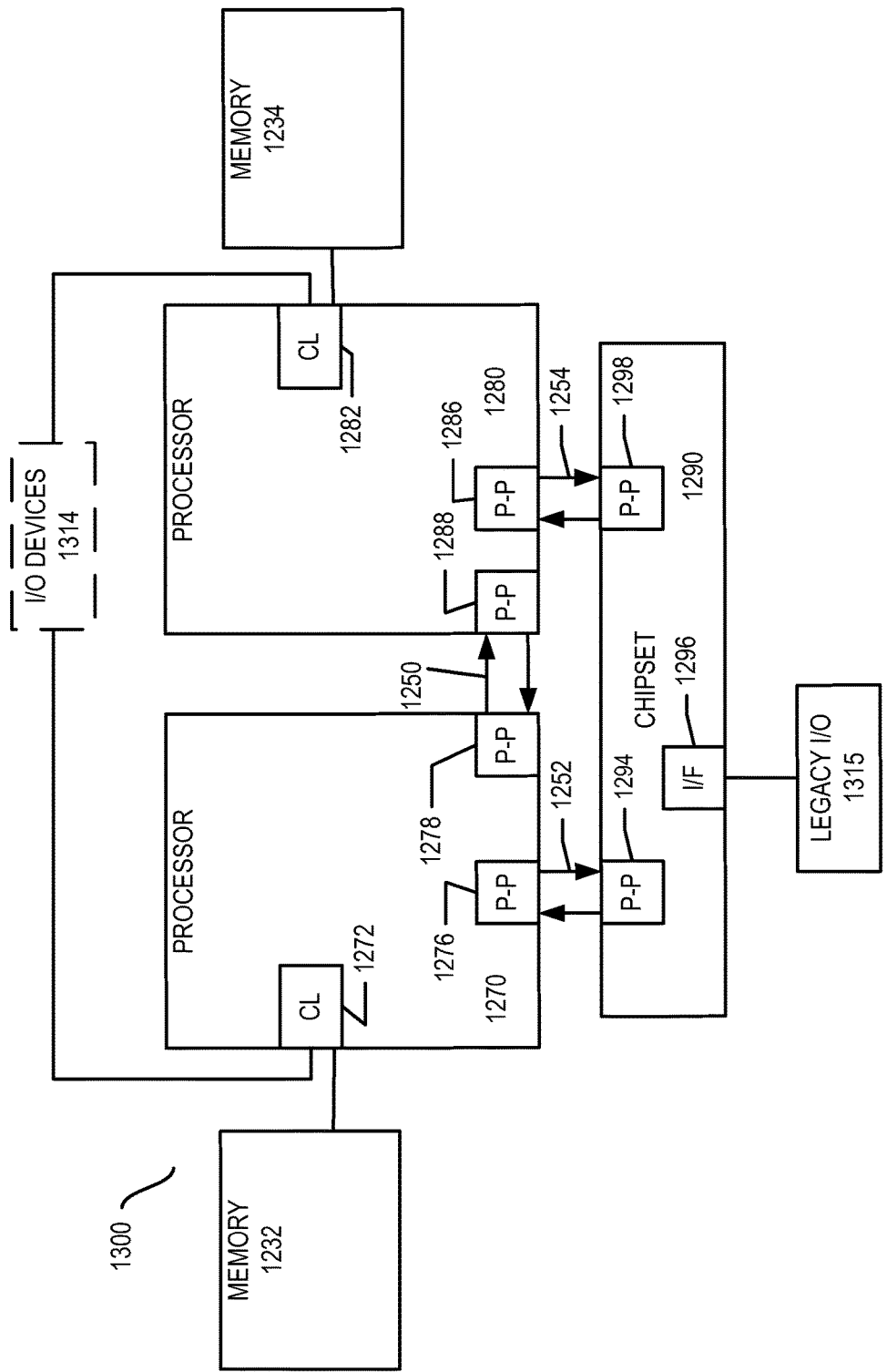
FIG. 13 shown is a block diagram of a second more specific exemplary system in accordance with an embodiment of the present invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
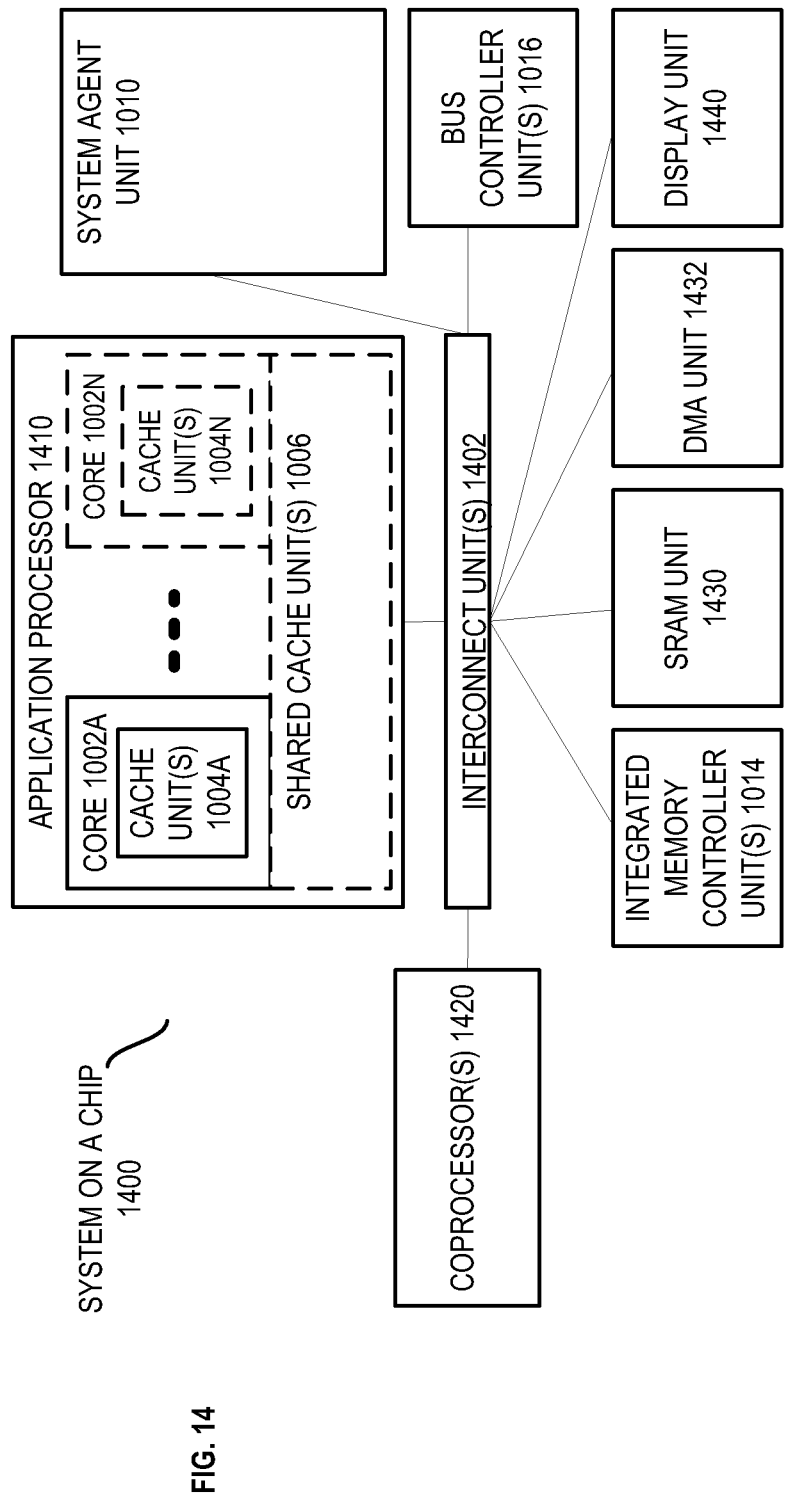
FIG. 14 shown is a block diagram of a SoC in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

In the description and claims, the term "logic" may have been used. As used herein, the term logic may include but is not limited to hardware, firmware, software, or a combination thereof. Examples of logic include integrated circuitry, application specific integrated circuits, analog circuits, digital circuits, programmed logic devices, memory devices including instructions, etc. In some embodiments, the logic may include transistors and/or gates potentially along with other circuitry components.

In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The term "and/or" may have been used. As used herein, the term "and/or" means one or the other or both (e.g., A and/or B means A or B or both A and B).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. All equivalent relationships to those illustrated in the drawings and described in the specification are encompassed within embodiments of the invention. In other instances, well-known circuits, structures, devices, and operations have been shown in block diagram form or without detail in order to avoid obscuring the understanding of the description.

Where considered appropriate, reference numerals have been repeated among the figures to indicate components that may optionally be substantially the same and have similar characteristics. In other instances, terminal portions of reference numerals have been repeated among the figures to indicate corresponding or analogous elements, which may optionally have similar or the same characteristics unless specified or clearly apparent otherwise. In some cases, where multiple components have been shown and described, they may be incorporated into a single component. In other cases, where a single component has been shown and described, it may be separated into two or more components. In the drawings, arrows represent couplings and bidirectional arrows represent bidirectional couplings.

Various operations and methods have been described. Some of the methods have been described in a relatively basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. The components, features, and specific optional details described herein for an apparatus also optionally apply to the methods described herein which may in embodiments be performed by and/or with such an apparatus.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, one or more, or a sequence of instructions, that if executed by a machine causes the machine to perform and/or results in the machine performing one or operations, methods, or techniques disclosed herein. In some embodiments, the machine-readable medium may include a tangible non-transitory machine-readable storage media. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or the like. The tangible medium may include one or more solid or tangible physical materials, such as, for example, a semiconductor material, a phase change material, a magnetic material, etc. In another embodiment, the machine-readable media may include a non-tangible transitory machine-readable communication medium, for example, the electrical, optical, acoustical or other forms of propagated signals, such as carrier waves, infrared signals, digital signals, etc.

Examples of suitable machines include, but are not limited to, computer systems, desktops, laptops, notebooks, netbooks, nettops, Mobile Internet devices (MIDs), servers, network elements (e.g., routers, switches, etc.) cellular phones, media players, nettops, set-top boxes, video game controllers, and other electronic devices having one or more processors or other instruction execution apparatus. Such electronic devices typically include one or more processors coupled with one or more other components, such as one or more storage devices (non-transitory machine-readable storage media), user input/output devices (e.g., a keyboard, a touchscreen, and/or a display), and/or network connections. The coupling of the processors and other components is typically through one or more busses and bridges (also termed bus controllers). Thus, the storage device of a given electronic device may store code and/or data for execution on the one or more processors of that electronic device. Alternatively, one or more parts of an embodiment of the invention may be implemented using different combinations of software, firmware, and/or hardware.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A processor comprising:
   a plurality of logical processors each having one or more corresponding lower level caches;
   a shared higher level cache that is to be shared by the plurality of logical processors, in which the shared higher level cache includes a physically distributed cache slice that is physically distributed across a die for each of the plurality of logical processors, wherein the physically distributed cache slices are physically separated from one another on the die; and
   logic to direct a missed access in one or more lower level caches of a corresponding given logical processor initially to only a first subset of the physically distributed cache slices of the shared higher level cache of a first virtual cluster that includes at least two of the plurality of logical processors including the given logical processor, wherein the first virtual cluster does not include a second subset of the physically distributed cache slices of the shared higher level cache that are included in a second virtual cluster that includes at least two of the plurality of logical processors.

2. The processor of claim 1, wherein the first virtual cluster includes a same number of cache slices as the second virtual cluster, and wherein a cache slice of the first virtual cluster is shared by said at least two of the plurality of logical processors.

3. The processor of claim 1, wherein the first virtual cluster includes predominantly proximally physically located logical processors that are closer on average to one another than they are to logical processors of the second virtual cluster.

4. The processor of claim 1, wherein the first virtual cluster includes predominantly logical processors directly coupled to a common interconnect structure, and wherein the second virtual cluster predominantly logical processors directly coupled to a different common interconnect structure.

5. The processor of claim 1, wherein the processor is to reduce a power consumption state of the first virtual cluster without reducing a power consumption state of the second virtual cluster.

6. The processor of claim 1, wherein most logical processors of the first virtual cluster are directly coupled to a first ring interconnect and at least one logical processor of the first virtual cluster is directly coupled to a second ring interconnect.

7. The processor of claim 1, wherein the plurality of logical processors are monolithically integrated on a semiconductor substrate, and wherein the plurality of logical processors comprise at least twelve cores.

8. The processor of claim 1, wherein the virtual cluster includes a plurality of sub-clusters that each are to include a subset of the physically distributed cache slices of the virtual cluster.

9. The processor of claim 1, wherein the first virtual cluster includes a corresponding cache coherency aware memory controller.

10. The processor of claim 9, wherein, if the missed access misses in the first subset of the physically distributed cache slices in the first virtual cluster, the missed access is directed to the cache coherency aware memory controller corresponding to the first virtual cluster.

11. The processor of claim 10, wherein the cache coherency aware memory controller is able to snoop cache slices in one or more other virtual clusters to attempt to service the missed access.

12. The processor of claim 1, wherein the processor has two virtual clusters, wherein each logical processor of each of the two virtual clusters has a corresponding logical processor identifier, and wherein a single bit in a corresponding position in each of the logical processor identifiers is used to identify which of the two virtual clusters the corresponding logical processor is in.

13. The processor of claim 12, wherein the logical processor identifiers are derived from a hash.

14. A method comprising:
   virtually clustering a first plurality of logical processors, including a given logical processor, into a first virtual cluster;
   virtually clustering a second plurality of logical processors into a second virtual cluster, in which each of the first and second pluralities of logical processors has one or more corresponding lower level caches; and
   directing an access that misses in one or more lower level caches corresponding to the given logical processor initially to only a first subset of physically distributed cache slices, of a shared higher level cache, that are in the first virtual cluster that corresponds to the given logical processor, wherein the first virtual cluster does not include a second subset of the physically distributed cache slices, of the shared higher level cache, that correspond to the second virtual cluster, and wherein each of the physically distributed cache slices in the first subset is physically co-located on a die with a different one of the first plurality of logical processors, and each of the physically distributed cache slices in the second subset is physically co-located on the die with a different one of the second plurality of logical processors.

15. The method of claim 14, wherein the first virtual cluster has a same number of cache slices as the second virtual cluster.

16. The method of claim 14, wherein the first virtual cluster includes predominantly proximally physically located logical processors that are closer on average to one another than they are to logical processors of the second virtual cluster.

17. The method of claim 14, wherein the first virtual cluster includes predominantly logical processors that are directly coupled to a common interconnect structure, and wherein the second virtual cluster includes predominantly logical processors that are directly coupled to a different common interconnect structure.

18. The method of claim 14, wherein the processor has two virtual clusters, wherein each logical processor of each of the two virtual clusters by a corresponding logical processor identifier, and further comprising using a single bit that is in a same corresponding position in each of the logical processor identifiers to identify which of the two virtual clusters the corresponding logical processor is in.

19. The method of claim 14, further comprising reducing a power consumption state of the first virtual cluster without reducing a power consumption state of the second virtual cluster.

20. The method of claim 14, wherein the first virtual cluster has a corresponding cache coherency aware memory controller, and further comprising, if the access misses in the first subset of the physically distributed cache slices in the first virtual cluster, directing the access to the cache coherency aware memory controller corresponding to the first virtual cluster.

21. The method of claim 20, further comprising the cache coherency aware memory controller snooping cache slices in one or more other virtual clusters to attempt to service the access.

* * * * *